United States Patent Office 3,332,920
Patented July 25, 1967

3,332,920
NEW COPOLYMERS AND ARTICLES
Keith Jasper Clark, Welwyn Garden City, and Michael Edward Benet Jones, Hitchin, England, assignors to Imperial Chemical Industries Limited, London, England, a corporation of Great Britain
No Drawing. Filed Oct. 10, 1963, Ser. No. 315,346
Claims priority, application Great Britain, Oct. 18, 1962, 39,478/62
15 Claims. (Cl. 260—88.2)

This invention relates to new copolymers and articles.

In our copending applications Nos. 22,695/61 and 43,034/61 we have disclosed our discovery of transparent polymers of 4-methyl-pentene-1 and of transparent articles made from this polymer. We have now found that certain copolymers of 4-methyl-pentene-1 with certain other α-olefines can also be transparent under suitable conditions, and that such copolymers also have certain advantages over homopolymers of 4-methyl-pentene-1.

According to the present invention we provide solid transparent copolymers of 4-methyl-pentene-1 with minor amounts of propylene or butene-1. We further provide a process for the manufacture of a solid transparent copolymer of 4-methyl-pentene-1 with a minor amount of propylene or butene-1 wherein 4-methyl-pentene-1 and propylene or butene-1 are polymerised in the presence of a stereospecific catalyst (as hereinafter defined) and the polymer obtained is de-ashed using dry reagents to reduce its ash content to less than 0.1% by weight and preferably to 0.02% by weight or less. It is a particular feature of the present invention to provide transparent copolymers of 4-methyl-pentene-1 containing between 0.5 and 20%, and preferably between 0.5 and 10% by weight of butene-1 monomer units. It is a further particular feature of the invention to provide transparent copolymers containing from 0.5 to 7% and preferably not more than 5% by weight of propylene monomer units.

The copolymers of our invention are solid crystalline polymers which contain the repeating units

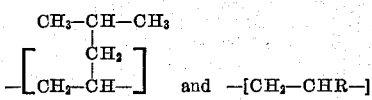

and —[CH$_2$—CHR—]

where R is either a methyl or an ethyl group, and are further characterised by melting points in the range 220–245° C., densities between 0.83 and 0.88 and melt flow indices (measured by ASTM method 1258–57T using a 5 kg. weight at 260° C.) between 0.01 and 1000.

In the term "copolymer" we include the products of both random and sequential polymerisation. In general, below about 95% by weight 4-methyl-pentene-1 content, clarity decreases and haze increases with decreasing 4-methyl-pentene-1 content of the copolymers.

In this specification, the word "transparent" when used of polymers, shall be taken to mean "capable of being transformed by a melt-shaping process into articles of which an ⅛" thick section has a degree of clarity of at least Grade 1 (as hereinafter defined) and a degree of haze of Group 1 (as hereinafter defined)"; when used of articles, the word "transparent" shall be taken to mean "having in ⅛" thick section a degree of clarity of at least Grade 1 (as hereinafter defined) and a degree of haze of Group 1 (as hereinafter defined)."

Overall impressions of transparency depend on two factors: clarity and haze. We define clarity as the ability to transmit light from distant objects without scattering. It is produced by forward scattering at small angles particularly within 0.5° of the incident beam. When the clarity is perfect, the sharpness of outline and resolution of detail of distant objects viewed through parallel sided specimens are unaffected. For measuring clarity we use the following method.

A sample is prepared of ⅛" thickness. To eradicate scattering at surface scratches or imperfections, thin glass plates are stuck to the surfaces of the sample with olive oil (which has a refractive index close to that of the copolymers of our invention). Through this sample, using a fived observation distance of 1.5 metres, a series of charts each consisting of equal width black and white lines arranged vertically, horizontally and diagonally are used. The line widths in the series are 1.0, 0.6, 0.24 and 0.175 millimetres, corresponding to angular resolutions of 0.038, 0.029, 0.0092 and 0.0067° (semi-angle). Tests are carried out in a dark room. The charts are illuminated at the most suitable brightness which is found to be about 500 candles per square metre. The sample is held close to one eye and the chart with the smallest spacing that can be resolved is noted and compared with the finest spacing that can be resolved in the absence of the sample. The results can then be expressed in terms of the loss of angular resolution due to the introduction of the sample between the eye and the charts and are independent of the limiting resolution of the eye of the observer.

For the purposes of this invention we distinguish four degrees of clarity. The clarity of mouldings from any particular sample of polymer depends not only on the conditions employed in preparing the polymer sample, but also on the conditions employed in making the mouldings.

The four degrees are:

Grade I: Loss of 0.0200° (semi-angle) resolution or less
Grade II: Loss of 0.0100° (semi-angle) resolution or less
Grade III: Loss of 0.0025° (semi-angle) resolution or less
Grade IV: No loss in visual resolution.

We define haze as the degree of scattering at high angles to the transmitted beam. Haze causes turbidity and hence reduction in contrast. To measure it, the intensity of light scattered from semi-angles of 2½°–90° to the incident transmitted beam is integrated and compared with the total transmittance (0–90°) of the sample.

We employ the method described in the American Society for Testing Materials publications "ASTM Standards on Plastics," 11th edition, 1959, as method No. 1003–59T.

In the polymers and articles of our invention we distinguish four degrees of haze.

Group 1: 0–45% haze
Group 2: 0–30% haze
Group 3: 0–15% haze
Group 4: 0–5% haze

The haze in a moulding, like the clarity, depends on both polymer quality and moulding conditions.

To prepare transparent polymer having the highest possible clarity and the lowest possible haze by the process of our invention, two things are essential; that a high proportion of the catalyst residues should be removed from the polymer produced, and that the polymer should not be allowed to come into contact with water until the catalyst removal process is at an end. For convenience in manipulating the polymer it is preferred that it should be produced in the form of an easily handleable slurry rather than a sticky gel. The important feature of ar easily handleable slurry is that it is separable, that is, one in which the liquid can be removed from the solid phase by mechanical means. Separability is important because in the de-ashing process, the catalyst residues are made to dissolve in the liquid phase; if this cannot be separated catalyst residues tend to remain in the polymer and transparent material is not easily obtained (of course, if the slurry is separable, the original liquid phase may be removed and the polymer can be re-slurried and de-ashing carried out in a different medium from that in which polymerisation took place). Methods which may be used to separate the two phases in suitable cases include centrifuging, filtration, washing with other liquids, decantation, or any combination of these processes. Where a slurry is thick and difficult to separate because it contains too high a proportion of suspended solids, separation is made much easier by dilution. If however, a thick slurry contains more than about 10% of its total polymer content dissolved in the diluent, it will generally not be possible to render it separable by dilution.

The following are the principal factors which affect the separability of a polymer slurry:

(1) The temperature of polymerisation and of separation
(2) The nature of the catalyst
(3) The nature of the diluent.

Each of these conditions must generally be adjusted to obtain a separable slurry. Increase in temperature of polymerisation increases the proportion of atactic polymer formed, and also gives rise to isotactic polymer of lower molecular weight, which dissolves more readily at all temperatures and particularly at the higher temperature at which it is formed. Provided stereospecific catalysts are used, the highest temperature at which a separable slurry can be obtained is that at which the isotactic polymer begins to be swollen by the diluent, or to dissolve in it to an appreciable extent.

Subject to the desirability of producing a separable slurry, one usually wants to polymerise at as high a temperature as possible, because the rate of polymerisation is then faster. The higher the temperature of polymerisation, the lower the molecular weight of polymer produced; to obtain polymer grades of higher molecular weight it may therefore be necessary to use temperatures below those which give the best rate consistent with separability. The molecular weight of the polymer formed may also be reduced, if desired, by the addition of certain polymerisation modifiers, notably hydrogen, to the reaction mixture.

There is no possibility of obtaining a separable slurry at all unless a stereospecific catalyst is employed. By a "stereospecific catalyst" we mean one which under the conditions used in polymerisation in this invention will polymerise propylene to polymer which is at least 70% insoluble in boiling heptane. It is well known that mixtures of transition metal compounds and organometallic compounds are in general effective for the polymerisation of α-olefines. However, unless the catalyst used in our invention has a stereoregular action which gives rise to a sufficiently high proportion of isotactic polymer it will tend to produce intractable gels instead of separable slurries. Generally, the more stereoregular the action of the catalyst, the higher the maximum temperature which may be used in polymerisation. It will not generally be possible to predict what catalysts are stereospecific and under what conditions; trial experiments must be made with each catalyst which it is proposed to use. In our preferred process for polymerisation below we describe two particularly useful catalysts, but our invention is not limited to the use of these.

The nature of the diluent affects the temperature at which the isotactic polymer will begin to be swollen by the diluent or to dissolve in it appreciably. Suitable diluents include petroleum ether (B.P. 60–80°), a petrol fraction boiling between 180 and 220° C., toluene, chlorobenzene and 4-methyl-pentene-1 itself. Each of these diluents will give, in suitable circumstances, separable slurries at temperatures at least as high as 45° C.

A slurry which contains dissolved in the diluent a concentration of not more than 10% of the polymer content is readily separable, and it is slurries of this kind that we prefer to use in our invention. Such slurries may readily be obtained by our preferred method of polymerisation, that is, by polymerising at about 40° or below, using a diluent which may be a high boiling petrol fraction, petroleum ether of boiling point 60–80°, or 4-methyl-pentene-1 itself and using as catalyst an aluminum dialkyl-chloride in combination with either the crystalline material obtained by reacting aluminum metal with excess titanium tetrachloride at a temperature between 80 and 220° C. and separating unreacted titanium tetrachloride from the product; or a material obtained by reducing titanium tetrachloride by adding it gradually to aluminum alklyl sesquichloride in a hydrocarbon medium with stirring in an inert atmosphere at 0° C., heating the slurry obtained slowly to 85° C., holding it with stirring at this temperature for four hours, cooling it, separating the precipitate obtained and washing it with a liquid hydrocarbon. It is particularly advantageous to use a catalyst prepared by the reduction of titanium tetrachloride in a hydrocarbon medium by adding aluminum alkyl sesquichloride thereto gradually over a period. The catalyst prepared in this way gives better slurries with higher contents of suspended polymer than the catalyst prepared by adding titanium tetrachloride to aluminum alkyl sesquichloride.

Polymerisation is carried out in the substantial absence of air and water. Nitrogen is often used to purge the apparatus beforehand. Many different techniques are available for copolymerising the monomers. Under the conditions normally used in polymerisation, 4-methyl-pentene-1 is a liquid (boiling point 54° C.) while propylene and butene-1 are gases. Truly random copolymers of homogeneous composition subject only to random variation, may be made by passing in both the liquid and the gaseous monomers at predetermined rates so that the concentration of both monomers in the reaction mixture is constant throughout. Random copolymers may also be made by beginning polymerisation with a large amount of 4-methyl-pentene-1 (which polymerises more slowly than either of the other two monomers) and passing in the gaseous monomer at a fixed rate throughout. In this way the copolymer initially formed may be slightly richer in 4-methyl-pentene-1 than that formed later, but the effect is not large. Sequential copolymerisation may be carried out by polymerising 4-methyl-pentene-1 while passing in the gaseous monomer for short periods at spaced intervals; this procedure may give rise to polymer molecules containing "blocks" of 4-methyl-pentene-1 homopolymer joined by blocks of random copolymer of 4-methyl-pentene-1 with propylene or butene-1. Finally, sequential copolymerisation may be carried out by polymerising successively pure monomers; this may be done by polymerising one monomer for a period, then removing all unreacted monomer from the polymerisation system (for example) by pumping it off under low pressure) and adding the second monomer and repeating the process. This procedure may give rise to polymer molecules containing successive blocks of homopolymer of the two monomers.

De-ashing of the polymer slurry obtained by polymerisation is carried out using dry reagents; if reagents containing water or aqueous extraction processes are used the polymer obtained shows an undesirable "blue haze" and may not be transparent. De-ashing may be carried out in two main ways. One is by adding a small quantity of reagent to the slurry, digesting for a period at a moderate temperature, e.g. between 40 and 60° C., followed by filtration and washing with more de-ashing reagent or hydrocarbon or mixtures of the two. The other is first to separate all or most of the polymerisation diluent from the polymer produced and to re-slurry the polymer one or more times in de-ashing reagent. In the first process the most suitable types of de-ashing reagents are the hydrocarbon-miscible alcohols such as butanol, the higher alcohols such as nonanol and isodecanol and higher acids and amines such as n-nonoic acid and 3,5,5,trimethyl-hexylamine. Particularly effective are mixtures of alcohols with complex-forming carbonyl compounds, such as isopropanol mixed with acetylacetone. In the second process it is of particular advantage to use the lower alcohols, such as methanol and ethanol, because of their cheapness. Suitable de-ashing procedures are further described in British patent application No. 43,034/61.

Finally the de-ashing reagent or wash liquid may be separated from the polymer by filtration or centrifuging followed by evaporative methods if it is of low boiling point, e.g. if it is methanol or a low boiling petroleum ether. If it is not low boiling, e.g. if it is a hydrocarbon liquid of high boiling point, it may be separated by filtration or centrifuging or washed from the polymer by a low boiling liquid which in its turn may be separated by evaporation. An alternative method for removing quantities of the wash liquid after filtration or centrifuging is steam distillation followed by drying the polymer. Final removal of a low boiling wash liquid may be satisfactorily accomplished by such methods as passing a gas (preferably for safety an inert gas such as nitrogen) through a cake of polymer particles on a filter, a centrifuge or a fluidised bed, and in an evaporative extruder.

Because of the optical and mechanical properties of the polymers of the present invention they are very suitable for manufacturing into bottles, for use for example in the foodstuffs, cosmetics and pharmaceutical industries. Manufacture of the articles of our invention using our polymers may be carried out by a variety of known techniques, e.g. extrusion, injection moulding, compression moulding, powder coating, blow moulding and methods such as that of British specification No. 821,634. In each case to obtain maximum transparency the hot article should be cooled rapidly from the molten state by some suitable process, e.g. in the case of compression moulding by withdrawing the hot article from the mould and quenching it with water, or in the case of extrusion by passing the extrudate directly to a cooling bath.

The copolymers of our invention have lower softening points than homopolymers of 4-methyl-pentene-1, which is advantageous in enabling them to be worked at lower temperatures. They may also show other advantages, for example, the optical properties of copolymers containing between 0.5 and 5% by weight of propylene or butene-1 are often better than those of the pure homopolymer. Certain of the copolymers of the invention are appreciably less brittle than the homopolymer, while certain other copolymers show less difference in the optical properties of quenched and unquenched mouldings.

The transparency of the copolymers of this invention is remarkable in view of the fact that blends of transparent poly-4-methyl-pentene-1 with as little as 1% by weight of polybutene-1 are only poorly translucent.

The following examples illustrate our invention but do not limit it in any way.

EXAMPLES 1–3

For each example, a 1-litre flask was carefully dried, and purged of oxygen by passing nitrogen through it. In it were placed 40 mls. 4-methyl-pentene-1 together with 200 mls. of a high boiling petrol fraction. As catalysts were added 30 millimoles aluminium diethyl chloride and 10 millimoles titanium trichloride (prepared by the reduction of $TiCl_4$ by adding it to ethyl aluminium sesquichloride as hereinbefore described). The temperature of the flask was raised to 40° C. and butene-1 was passed into the flask slowly at a precalculated rate. Five further additions of 40 ccs. 4-methyl-pentene-1 were made at hourly intervals. Polymerisation in this fashion was continued for 6 hours; then the flow of butene-1 was stopped and the reaction allowed to continue without further addition of monomer for another 18 hours. The reaction was then killed by adding 100 ccs. of a mixture of equal volumes of isopropanol (dried by the Grignard method) and acetylacetone (dried over calcium sulphate). The slurry obtained was transferred under nitrogen to a de-ashing apparatus and there filtered and washed three times with a mixture of equal volumes of isopropanol alcohol and petroleum ether and then twice with petroleum ether (B.P. 60–80° C.) alone. The polymer obtained was finally dried in an oven at 70° C. overnight. For each sample of polymer thus obtained two ⅛″ compression mouldings were made, using a pressure of 20 tons/square inch for 5 minutes at 265° C. One of these was quenched by removing it from the press before it had cooled to 200° C., and plunging it into water; the other was cooled as rapidly as possible in the press. Clarity, haze, and total light transmission experiments were made on each moulding. The percentage of butene-1 in each polymer sample was determined by infra-red methods. Results are shown in Table I below, and compared with a homopolymer of 4-methyl-pentene-1 prepared by similar methods.

EXAMPLE 4

The procedure of Examples 1–3 was followed, except that propylene instead of butene-1 was passed into the reaction mixture. Results are shown in Table I below.

TABLE I

| Example | Comonomer (percent by weight) | Moulding | Clarity Grade | Haze, percent | Transmission, percent |
|---|---|---|---|---|---|
| Blank | | Quenched | IV | 4.8 | 80 |
| | | Cooled in press | III–IV | 4.5 | 11 |
| 1 | Butene-1 (7.6%) | Quenched | IV | 2.7 | 93 |
| | | Cooled in press | IV | 3.5 | 75 |
| 2 | Butene-1 (8.1%) | Quenched | IV | 5.3 | 76 |
| | | Cooled in press | IV | 10.3 | 72 |
| 3 | Butene-1 (5.7%) | Quenched | IV | 3.6 | 91 |
| | | Cooled in press | IV | 7.0 | 71 |
| 4 | Propylene (1.4%) | Quenched | IV | 2.7 | 82 |
| | | Cooled in press | III–IV | 3.8 | 35 |

EXAMPLES 5–7

Butene-1 and 4-methyl-pentene-1 were sequentially polymerised by the following technique. A large flask was carefully dried and purged of air by passing nitrogen through it. In this flask were placed 400 mls. 4-methyl-pentene-1 mixed with 600 ccs. of a high-boiling petrol fraction, together with 40 millimoles aluminium diethyl chloride and 18.5 millimoles titanium trichloride (obtained as in Examples 1–3). The temperature of the reaction mixture was raised to 30° and polymerization began. After about an hour and a half, when some of the monomer had polymerised, the remainder was pumped off under high vacuum into a cold trap. Then about 3 grams of butene-1 dissolved in 50 ccs. of the high-boiling petrol fraction was added to the reaction mixture and allowed to polymerise in its turn, at the same temperature. Again, after a period of about an hour, unreacted monomer was pumped off; this was followed by purging the reaction vessel with nitrogen and then returning 4-methyl-pentene-1 to the reaction mixture from the cold trap. In Examples 6 and 7 this butene-4-methyl-pentene cycle was twice repeated. De-ashing was carried out as in Examples 1–3 (using suitably larger quantities of reagents). From each sample of polymer two mouldings were produced and measurements were made on these as in Examples 1–3. Results are shown in Table II.

TABLE II

| Example | Number of Blocks Butene-1 | Percent by Weight Butene-1 | Moulding | Clarity | Haze, percent | Transmission, percent |
|---|---|---|---|---|---|---|
| _ | 1 | 4.4 | Quenched | IV | 4.3 | 88 |
|   |   |     | Cooled in press | IV | 12.5 | 74 |
| _ | 3 | 4.6 | Quenched | IV | 1.6 | 89 |
|   |   |     | Cooled in press | IV | 3.2 | 72 |
| _ | 3 | 4.8 | Quenched | IV | 1.0 | 90 |
|   |   |     | Cooled in press | IV | 4.9 | 59 |

EXAMPLES 8–11

A three-necked flask of 2 litres capacity equipped with a stirrer and connected to a reservoir of liquid butene, was carefully dried and purged of air by passing nitrogen through it. 1 litre of 4-methyl-pentene-1 was then placed in the flask and stirred for a period under nitrogen at 20° C. Butene was then passed into the flask from the reservoir which was fitted with a constant pressure valve, enabling a constant pressure of butene to be maintained in the flask. Catalyst was then added (36 millimoles aluminum diethyl chloride and 12 millimoles $TiCl_3$ prepared by adding ethyl aluminum sesquichloride to $TiCl_4$ as hereinbefore described). Polymerisation continued for three hours at 20° C., the butene-1 pressure being maintained constant throughout. The reaction was stopped by adding to the flask a mixture of 40 mls. dry acetyl-acetone and 80 mls. dry isopropyl alcohol. A further 250 mls. dry isopropyl alcohol were then added to dilute the slurry, and the mixture was left to stand for some hours. Then the mixture was heated to 50° C. and transferred to de-ashing apparatus in which catalyst residues were eluted at a temperature of 56° C. with a mixture of 3 volumes dry isopropyl alcohol with 1 volume dry petroleum ether, the final treatment being with dry isopropyl alcohol alone. The polymer recovered was dried, and mouldings were made as in Examples 1–3. Details of polymerisation and results of tests on the mouldings are shown in Table III below.

by weight of butene-1 monomer units, and having an ash content of less than 0.1% by weight and a melting point of 220–245° C.

6. A shaped transparent article of the copolymer of claim 5.

7. The copolymer of claim 1 having an ash content of less than 0.02% by weight.

8. A process for the manufacture of a solid transparent crystalline copolymer of 4-methyl-pentene-1 with between 0.5 and 7% by weight of propylene monomer units or with between 0.5 and 10% by weight of butene-1 monomer units, said process comprising (a) polymerising the 4-methyl-pentene-1 and the propylene or butene-1 in the presence of a trivalent titanium halide/aluminum dialkyl halide catalyst in an inert diluent to produce a separable slurry of said copolymer in said diluent, and thereafter (b) separating the copolymer from said diluent and (c) de-ashing the copolymer with dry reagents until the copolymer ash content is less than 0.1% by weight, whereby the copolymer is transparent.

9. A process as claimed in claim 8 wherein the temperature of polymerisation is not above about 40° C.

10. A process as claimed in claim 8 which is carried out using excess 4-methyl-pentene-1 as liquid diluent medium.

11. A process as claimed in claim 8 wherein the ash content of the copolymer is reduced to less than 0.02% by weight.

TABLE III

| Example | Butene-1 pressure | Yield, g. | Percent Butene-1 | Moulding | Clarity Grade | Haze, percent | Transmission, percent |
|---|---|---|---|---|---|---|---|
| _ | 40 mm. Hg | 313 | 6.5 | Quenched | IV | 0.5 | 93 |
|   |           |     |     | Cooled in press | III–IV | 2.0 | 78 |
| _ | 60 mm. Hg | 305 | 7.7 | Quenched | IV | 0.7 | 94.5 |
|   |           |     |     | Cooled in press | III–IV | 3.8 | 82 |
| 0 | 80 mm. Hg | 299 | 11 | Quenched | IV | 4.3 | 88 |
|   |           |     |     | Cooled in press | III–IV | 5.6 | 77 |
| 1 | 60 for 30 mins. then 105. | 256 | 12 | Quenched | IV | 16 | 62 |
|   |           |     |     | Cooled in press | II–III | 17.5 | 58 |

We claim:

1. A solid transparent crystalline copolymer of 4-methyl-pentene-1 with a member selected from the group consisting of propylene and butene-1, said copolymer containing between 0.5 and 7% by weight of propylene monomer units or between 0.5% and 10% by weight of butene-1 monomer units, and having an ash content of less than 0.1% by weight, said butene-1/4-methyl-pentene-1 copolymer having a melting point of about 220 to 245° C.

2. A solid transparent crystalline copolymer of 4-methyl-pentene-1 containing between 0.5 and 7% by weight of propylene monomer units.

3. A shaped transparent article of the copolymer of claim 2.

4. A copolymer as claimed in claim 2 containing not more than 5% by weight of propylene monomer units.

5. A solid transparent crystalline copolymer of 4-methyl-pentene-1 containing from between 0.5 and 10%

12. A process as claimed in claim 8 wherein as de-ashing reagent is used an alcohol, or a mixture of an alcohol and acetylacetone.

13. A process as claimed in claim 12 wherein the alcohol is methanol, ethanol, isopropanol, butanol or nonanol.

14. The process of claim 8 including a final step of subjecting the copolymer to a melt shaping process to form a shaped, transparent article of said copolymer.

15. The process of claim 14 wherein the shaped article is readily cooled from the molten state by quenching with water.

References Cited

UNITED STATES PATENTS

| 2,957,225 | 10/1960 | Welch et al. | 260—93.7 |
| 3,029,215 | 4/1962 | Campbell | 260—88.2 |
| 3,098,845 | 7/1963 | Cull | 260—94.9 |

JOSEPH L. SCHOFER, *Primary Examiner.*

L. EDELMAN, *Assistant Examiner.*